No. 750,073. PATENTED JAN. 19, 1904.
J. ANDERSON.
COMBINED SAW SET AND JOINTER.
APPLICATION FILED MAY 7, 1903.
NO MODEL.
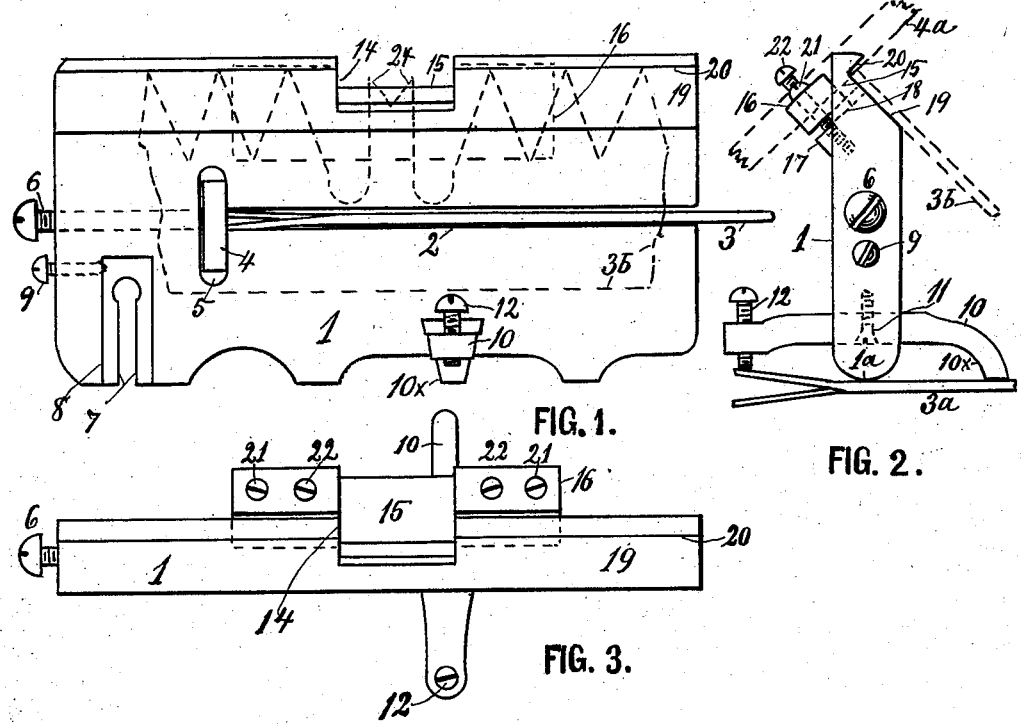

No. 750,073. Patented January 19, 1904.

UNITED STATES PATENT OFFICE.

JONAS ANDERSON, OF ST. PAUL, MINNESOTA.

COMBINED SAW SET AND JOINTER.

SPECIFICATION forming part of Letters Patent No. 750,073, dated January 19, 1904.

Application filed May 7, 1903. Serial No. 156,004. (No model.)

*To all whom it may concern:*

Be it known that I, JONAS ANDERSON, a subject of the King of Sweden and Norway, residing at St. Paul, in the county of Ramsey and State of Minnesota, have invented certain new and useful Improvements in a Combined Saw Set and Jointer; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in combined saw sets and jointers; and the object of the invention is to provide a cheap but efficient combination-tool by which saws of various kinds and sizes may be jointed and set and also have some of their teeth filed shorter than the rest of the teeth where so desired, as will presently be fully set forth. This object I attain by the novel construction and arrangement of parts illustrated in the accompanying drawings, in which—

Figure 1 is a side elevation of my improved saw set and jointer. Fig. 2 is an end view of Fig. 1, and Fig. 3 is a top view of Fig. 1.

Referring to the drawings by reference-numerals, 1 designates a cast plate or handle-piece, preferably of malleable iron. It is formed with a longitudinal gap 2 for the insertion of a saw 3 when the latter is to have its points filed to even length, which is then done by the file 4, held in the slot 5 by the set-screw 6. The saw-teeth are set by the steel jaw 7, which is secured in the gap 8 by the set-screw 9, so that the jaw may be removed for repair or exchange with jaws of other sizes. 10 is a gage dovetailed into the edge of the plate 1 and secured by the screw 11. (See Figs. 1 and 2.) The end $10^\times$ of the gage is curved toward the saw-blade when the latter is placed in the position $3^a$ in Fig. 2, touching against the edge $1^a$ of the plate or handle-piece. The other end of the gage is provided with a screw 12, which may be turned, so as to adjust its point into contact with a saw-tooth more or less set.

In the edge of the plate 1 opposite from the gage 10 is provided a notch 14, in which is fitted loosely a diagonal shelf 15 of a gage piece or bar 16, normally resting on a base formed of the projection 17 and the bottom of the angular groove 18 of the main plate 1. At right angles with the shelf 15 the plate 1 has a beveled face 19, with an angular guarding-rib 20 near its edge. The gage-bar 16 is adjustable to and from the base 17 by means of two screws 21, put through the gage-bar and threaded into the base, and two screws 22, threaded in the gage-bar and pressing with their points upon the base.

In Figs. 1 and 2 the dotted lines $3^b$ represent a drag-saw placed flat against the face 19 and with the points of the teeth against the guard 20. While the saw is in that position, or rather while the handle-piece 1 is held in that position against the saws with one hand the operator holds a file $4^a$, Fig. 2, in the other hand parallel to the shelf 15, and files off the points of teeth, like 24 in Fig. 1, so that those teeth will be slightly shorter than the V-shaped teeth, which is a well-known requirement in such saws; but as the said teeth may have to be more or less shorter than the regular teeth the gage 16 is made adjustable, as described, and the operator files until the file touches upon the shelf 15.

Having thus described my invention, what I claim, and desire to secure by Letters Patent, is—

The combination of the flat handle-piece 1, having in one edge a transverse notch and in the notch an adjustable shelf 15 for guiding the direction of a file and regulating the depth the file is to cut, the guard 20 and the face 19 along said edge of the handle-piece, a gage-bar 10 secured across the opposite edge of the handle-piece; said face 19 standing at such an incline to the side of the handle-piece that a saw-blade placed flat upon the face 19 will clear the end of the bar 10, and said shelf 15 being inclined with its face at right angle with the face 19, substantially as and for the purpose set forth.

In testimony whereof I affix my signature in presence of two witnesses.

JONAS ANDERSON.

Witnesses:
D. E. CARLSEN,
A. M. CARLSEN.